United States Patent
Wu et al.

(10) Patent No.: US 10,063,315 B2
(45) Date of Patent: Aug. 28, 2018

(54) METHOD AND SYSTEM FOR HIGH-PRECISION TWO-WAY FIBER-OPTIC TIME TRANSFER

(71) Applicant: Shanghai Jiao Tong University, Shanghai (CN)

(72) Inventors: Guiling Wu, Shanghai (CN); Liang Hu, Shanghai (CN); Hao Zhang, Shanghai (CN); Jianping Chen, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 15/389,389

(22) Filed: Dec. 22, 2016

(65) Prior Publication Data

US 2017/0104528 A1 Apr. 13, 2017

Related U.S. Application Data

(63) Continuation-in-part of application No. PCT/CN2014/083164, filed on Jul. 28, 2014.

(30) Foreign Application Priority Data

Jul. 4, 2014 (CN) .......................... 2014 1 0320947

(51) Int. Cl.
*H04B 10/00* (2013.01)
*H04B 10/079* (2013.01)
(Continued)

(52) U.S. Cl.
CPC ..... *H04B 10/0795* (2013.01); *H04B 10/2503* (2013.01); *H04J 3/0638* (2013.01); *H04J 14/08* (2013.01); *H04L 7/0075* (2013.01)

(58) Field of Classification Search
None
See application file for complete search history.

(56) References Cited

U.S. PATENT DOCUMENTS

| | | | |
|---|---|---|---|
| 5,673,133 A | 9/1997 | Imaoka et al. | |
| 7,535,931 B1 * | 5/2009 | Zampetti | H03L 7/08 370/252 |

(Continued)

FOREIGN PATENT DOCUMENTS

| | | |
|---|---|---|
| CN | 102340354 A | 2/2012 |
| CN | 102638324 A | 8/2012 |
| CN | 103812593 A | 5/2014 |

OTHER PUBLICATIONS

Imaoka, A. et al., "Accurate Time/Frequency Transfer Method Using Bidirectional WDM Transmission," IEEE Transactions on Instrumentation and Measurement, vol. 47, No. 2, pp. 537-542 (Apr. 30, 1998).

(Continued)

*Primary Examiner* — Ken N Vanderpuye
*Assistant Examiner* — Jai Lee
(74) *Attorney, Agent, or Firm* — Mei & Mark LLP; Manni Li

(57) ABSTRACT

A method and system for high-precision two-way fiber-optic time transfer comprising pre-adjusting, including calculating a local timing signal adjustment amount for a first fiber-optic time synchronization unit and a second fiber-optic time synchronization unit, and the corresponding adjusting. and following steps including the two fiber-optic time synchronization units conducting two-way time transfer based on a time division multiplexing transmission over an optical fiber link. The present invention realizes high-precision fiber-optic time transfer by combining two-way time transfer and bidirectional time division multiplexing technique.

6 Claims, 5 Drawing Sheets

(51) Int. Cl.
*H04J 14/08* (2006.01)
*H04B 10/25* (2013.01)
*H04L 7/00* (2006.01)
*H04J 3/06* (2006.01)

(56) References Cited

U.S. PATENT DOCUMENTS

| | | | | |
|---|---|---|---|---|
| 8,954,609 | B1* | 2/2015 | Holleman | H04J 3/0667 709/203 |
| 9,537,576 | B2* | 1/2017 | Wu | H03M 5/14 |
| 2007/0147265 | A1* | 6/2007 | Eidson | H04J 3/0697 370/252 |
| 2010/0073229 | A1* | 3/2010 | Pattabiraman | G01S 19/11 342/357.64 |
| 2011/0261917 | A1* | 10/2011 | Bedrosian | H04J 3/0667 375/371 |
| 2011/0296226 | A1* | 12/2011 | Sorbara | H04J 3/0638 713/400 |
| 2013/0091531 | A1* | 4/2013 | Danielsson | H04J 3/0638 725/116 |
| 2013/0121352 | A1* | 5/2013 | Shen | H04J 3/0667 370/503 |
| 2013/0195443 | A1* | 8/2013 | Yin | H04J 3/0667 398/25 |
| 2013/0202291 | A1* | 8/2013 | Cavaliere | H04B 10/07 398/33 |
| 2015/0093122 | A1* | 4/2015 | Wu | H03M 5/14 398/190 |

OTHER PUBLICATIONS

Sliwczynski, Ł. et al., "Bidirectional Optical Amplification in Long Distance Two-Way Fiber-Optic Time and Frequency Transfer Systems," IEEE Transactions on Instrumentation and Measurement, vol. 62, No. 1, pp. 253-262 (Jan. 31, 2013).

Wang, Subei et al., "Design and Verification of a Time Code for Fiber-Optic Two-Way Time Transfer," Optical Communication Technology, No. 1, pp. 22-24 (Jan. 31, 2013), Abstract only.

Ł. Śliwczyński et al., Dissemination of time and RF frequency via a stabilized fibre optic link over a distance of 420 km, Metrologia, 50(2):133-145 (Feb. 11, 2013).

Lopez, Olivier et al., "Simultaneous remote transfer of accurate timing and optical frequency over a public fiber network." Applied Physics B110.1 (2013): 3-6 (Oct. 7, 2012).

V. Smotlacha et al., "Time transfer using fiber links," Proc. 24th European Frequency and Time Forum, Noordwijk, the Netherlands, 2010.

D. Piester et al., "Remote atomic clock synchronization via satellites and optical fibers," Adv. Radio Sci., 9(1):1-7, 2011.

* cited by examiner

METHOD AND SYSTEM FOR HIGH-PRECISION TWO-WAY FIBER-OPTIC TIME TRANSFER

CROSS-REFERENCE TO RELATED APPLICATIONS

The subject application is a continuation-in-part of PCT/CN2014/083164 filed on Jul. 28, 2014, which claims priority on Chinese patent application 201410320947.0 filed on Jul. 4, 2014 in China. The contents and subject matter of the PCT international application and Chinese priority application are incorporated herein by reference.

FIELD OF INVENTION

The present invention relates to fiber-optic time and frequency transfer, particularly, a method and a system for high-precision two-way fiber-optic time transfer.

BACKGROUND ART

High-precision time synchronization is of applicable value in satellite navigation, aerospace industry, deep space exploration, geodesy, communication, and scientific research and measurements, etc. Traditionally, GPS common view or two-way satellite time transfer is employed in high-precision time synchronization. GPS common view requires relatively simple and low cost equipment, but is unable to achieve a precision of better than one nanosecond. Two-way satellite time transfer has a precision at the level of sub-nanosecond, but its stability, particularly in short-term, is prone to disturbance by the free space. So the precision of two-way satellite time transfer is difficult to be further improved, with further disadvantages in the security and high cost.

A fiber channel is highly stable, particularly within a short time scale, immune to outer influence, and has a low loss and high bandwidth. It first attracts researchers' attention in the 1980s. With rapid development in optical fiber communication and optical network technology and increased requirements for time synchronization precision, optical fiber based time synchronization achieves great progress and has been applied to certain extent.

High-precision fiber-optic time transfer has two major methods, the round-trip time transfer and the two-way time transfer. Round-trip time transfer is realized by means of stabilizing a link delay and calibrating the link propagation delay via returned signals from a far end. A 420 kilometer fiber-optic time and frequency transfer experiment based on the scheme has been demonstrated by AGH university of Polish with a time transfer stability of 1 ps/d. See Ł. Śliwczyński et al., "Dissemination of time and RF frequency via a stabilized fibre optic link over a distance of 420 km," Metrologia, 50(2):133-145, 2013. Based on the similar scheme, the Laser Physics Laboratory in France reported a 540 kilometer time and optical carrier transfer experiment employing a satellite time and ranging equipment (SATRE) from the TimeTech in Germany, with a time transfer stability of 50 ps/s. See Lopez, Olivier et al., "Simultaneous remote transfer of accurate timing and optical frequency over a public fiber network," Applied Physics B110.1 (2013): 3-6.

Two-way fiber-optic time transfer based on WDM all-optical path is similar to two-way satellite time transfer. The clock difference between two sites is obtained by making use of path symmetry to eliminate link delay and its variation via simultaneously sending the local timing signals (1PPS) from the both ends to their counterparts. The CESNET in Czech reported a 744 kilometer two-way time transfer experiment over a single fiber based on the scheme, with a stability of 8.7 ps/500 s. See V. Smotlacha et al., "Time transfer using fiber links," Proc. 24th European Frequency and Time Forum, Noordwijk, the Netherlands, 2010. The SP Technical Research Institute of Sweden carried out a 560 kilometer two-way time transfer over a domestic WDM optical network, and compared the synchronization result with the one of carrier phase, which is below 1 ns.

In order to suppress the influences from Raleigh backscattering and Fresnel reflection on the transmitted timing signals, both of the aforementioned schemes adopt bidirectional WDM transmission method (that is, different transmission optical wavelengths for two directions), and result in a bidirectional propagation delay asymmetry due to the fiber dispersion, which increases with the increase of distance and limits the precision of two-way time transfer over long distance. As regarding to the round-trip method, it is difficult to accurately calibrate the link delay for thousands of kilometers time transfer, due to the dispersion difference of fiber links in the practical networks. The PTB in Germany carried out a 73 kilometer two-way time transfer experiment by adopting the SATRE of the TimeTech. The method adopts the spread spectrum coding/decoding and realizes two-way time transfer over a single fiber with the same wavelength. However, high-precision spread spectrum coding/decoding is complex and has a high cost. See D. Piester et al., "Remote atomic clock synchronization via satellites and optical fibers," Adv. Radio Sci., 9(1):1-7, 2011.

SUMMARY OF THE INVENTION

The present invention overcomes the deficiency in prior art by providing a high-precision fiber-optic time transfer method based on bidirectional time division multiplexing transmission over a single fiber with the same wavelength (BTDM-SFSW) which can break restrictions from the Rayleigh backscattering noise and dispersion, and on the basis of the method, further provides a high-precision two-way time transfer system.

The present invention provides a high-precision two-way fiber-optic time transfer method, successively comprising pre-adjusting, BTDM based two-way time transfer, and dynamically synchronizing.

The step of pre-adjusting refers to one-way time transfer via a first optical fiber synchronization unit and a second optical fiber synchronization unit, respectively, for preliminarily measuring the time interval between sending of a time code by the first fiber-optic time synchronization unit and receiving of the time code returned from the second fiber-optic time synchronization unit, and another time interval between receiving of the time code from the first fiber-optic time synchronization unit and the local timing signal at the second fiber-optic time synchronization unit. Calculate an adjustment delay for the local time signal at the first fiber-optic time synchronization unit or the second fiber-optic time synchronization unit according to the above two measured time intervals, a preset time code length, and a preset BTDM interval margin. If it is required to adjust the local time signal at the first fiber-optic time synchronization unit, the first fiber-optic time synchronization unit will do so according to the calculated adjustment delay; otherwise the first fiber-optic time synchronization unit will send the calculated value to the second fiber-optic time synchronization unit, and the second fiber-optic time synchronization unit will adjust its local timing signal according to the received adjustment delay value.

The step of BTDM based time transfer refers to sending time codes including the corresponding local timing signal to each other through the first fiber-optic time synchronization unit and the second fiber-optic time synchronization unit, respectively, while the local timing signal at the corresponding sites is valid, for realization of the two-way time transfer based on division multiplexing time.

The step of dynamically synchronizing refers to dynamically adjusting the sending time of the local timing signal for the first fiber-optic time synchronization unit by itself to prevent that the first fiber-optic time synchronization unit and the second fiber-optic time synchronization unit simultaneously have optical signals being transmitted in the fiber link.

The present invention provides a high-precision fiber-optic time transfer method based on time division multiplexing, comprising the following steps:

Step S1, pre-adjusting, which comprises

① a first fiber-optic time synchronization unit sends a time code via an optical fiber link to a second fiber-optic time synchronization unit at detecting a local timing signal for the first fiber-optic time synchronization unit;

② the second fiber-optic time synchronization unit, at detecting the timing signal from the first fiber-optic time synchronization unit, measures a difference $\tau'_{12}$ between its local timing signal and the timing signal received from the first fiber-optic time synchronization unit, and while the local timing signal is valid, coding the difference $\tau'_{12}$ into the time code and sending to the first fiber-optic time synchronization unit via the optical fiber link;

③ the first fiber-optic time synchronization unit measures a difference $\tau'_{12}$ between its local timing signal and the timing signal received from the second fiber-optic time synchronization unit, and decodes from the time code the difference $\tau'_{12}$ measured by the second fiber-optic time synchronization unit;

④ the first fiber-optic time synchronization unit determine the time synchronization unit required to be adjusted and the corresponding timing signal adjustment delay according to a rule as shown in Table 1 to meet a two-way time division multiplexing requirement, wherein $\Delta$ being a length between two consecutive timing signal (e.g., $\Delta$ is equal to 1 second if the transmitted time signal is 1PPS); $\tau_B$ being a time length ($<\Delta/2$) of the time code; $\tau_M$ being a redundant time reserved ($<\Delta/2$, and greater than the sum of a time for initiating sending of an optical signal, a time for suspending sending of the optical signal, and an error in measurement of the time interval) for time division multiplexing.

TABLE 1

| Condi 1 | Condi 2 | Adjust unit | Adjust amount $\Delta\tau_{adi}'$ |
|---|---|---|---|
| $\tau_{21}' < \Delta$ | $\Delta - \tau_{12}' > \tau_B + \tau_M$ | 1$^{st}$ fiber-optic time syn. unit | $(\tau_B + \tau_M) - (\Delta - \tau_{21}')$ |
| | others | No need for adjustment | |
| $\tau_{21}' \geq \Delta$ | $\Delta - \tau_{12}' < \tau_B + \tau_M$ | 2$^{nd}$ fiber-optic time syn. unit | $(\tau_B + \tau_M) - (\Delta - \tau_{12}')$ |
| | $\tau_{12}' < \tau_B + \tau_M$ $(\tau_{12}' > (\tau_B + \tau_M) - (\tau_{21}' - \Delta)$ | 1$^{st}$ fiber-optic time syn. unit | $(\tau_B + \tau_M) + \tau_{21}'$ |
| | $(\tau_B + \tau_M) - (\tau_{21}' - \Delta) >$ | 2$^{nd}$ fiber-optic time syn. unit | $(\tau_B + \tau_M) + \tau_{12}'$ |

TABLE 1-continued

| Condi 1 | Condi 2 | Adjust unit | Adjust amount $\Delta\tau_{adi}'$ |
|---|---|---|---|
| | $(\tau_B + \tau_M) - \tau_{12}'$ others | No need for adjustment | |

If it is required to adjust the sending time of the second fiber-optic time synchronization unit, the first fiber-optic time synchronization unit sends the adjustment amount $\Delta\tau'_{ad2}$ to the second fiber-optic time synchronization unit; the second fiber-optic time synchronization unit adjusts the sending time of its local timing signal via a time delay adjustor (TDA) in accordance with the received adjustment amount $\Delta\tau'_{ad2}$, and records the adjustment amount.

If it is required to adjust the sending time of the first fiber-optic time synchronization unit, the first fiber-optic time synchronization unit adjusts the sending time of its local timing signal via a TDA in accordance with the adjustment amount $\Delta\tau'_{ad1}$, and records the adjustment amount.

Step S2, the two fiber-optic time synchronization units conducts two-way time transfer through time division multiplexing over the optical fiber link, comprising step S201, the first fiber-optic time synchronization unit measures a difference $\tau_{21}$ between its local timing signal and the timing signal received from the second fiber-optic time synchronization unit, the second fiber-optic time synchronization unit measures a difference $\tau_{12}$ between its local timing signal and the timing signal received from the first fiber-optic time synchronization unit;

step S202, the first fiber-optic time synchronization unit launches optical signal into the fiber link while the local timing signal is valid, for sending the second optical fiber time synchronization unit the time code carrying the local timing signal, a time info, the measured difference $\tau_{21}$ of the local timing signal with the timing signal received from the second fiber-optic time synchronization unit, and the adjustment amount $\Delta\tau_{ad1}$ for the local timing signal of the first fiber-optic time synchronization unit, and switches off the optical signal transmission in other time durations;

the second fiber-optic time synchronization unit launches optical signal into the optical fiber link while the local timing signal is valid, for sending the first fiber-optic time synchronization unit the time code carrying the local timing signal, a time info, the measured difference $\tau_{12}$ of the local timing signal with the timing signal received from the first fiber-optic time synchronization unit, and the adjustment amount $\tau_{12}$ of the local timing signal of the second fiber-optic time synchronization unit, and switched off optical signal transmission at other time durations;

step S203, the first fiber-optic time synchronization unit and the second fiber-optic time synchronization unit, respectively, determines the fiber-optic time synchronization unit requiring timing signal adjustment and the corresponding adjustment amount in accordance with Table 2:

TABLE 2

| condition | adjustment unit | adjustment amount $\Delta\tau_{adi}$ |
|---|---|---|
| $\Delta - \tau_{12} > \tau_B + \tau_M$ | 2$^{nd}$ fiber-optic time synchronization unit | $(\tau_B + \tau_M) - (\Delta - \tau_{12})$ |
| $\Delta - \tau_{21} > \tau_B + \tau_M$ | 1$^{st}$ fiber-optic time synchronization unit | $(\tau_B + \tau_M) - (\Delta - \tau_{21})$ |

TABLE 2-continued

| condition | adjustment unit | adjustment amount $\Delta\tau_{adi}$ |
|---|---|---|
| others | | No adjustment need |

$\Delta\tau_{ad1}$ being the adjustment amount of the local timing signal of the first fiber-optic time synchronization unit at a two-way time transfer stage, and $\Delta\tau_{ad2}$ being the adjustment amount of the local timing signal of the second fiber-optic time synchronization unit at the two-way time transfer stage.

Step S204, at deciding by the first optical fiber time synchronization unit to adjust the local timing signal of the first fiber-optic time synchronization unit, the first fiber-optic time synchronization unit adjusting its local timing signal via time delaying in accordance with the timing signal adjustment amount $\Delta\tau_{ad1}$ of the first fiber-optic time synchronization unit, and updating the timing signal adjustment amount $\Delta\tau'_{ad1}$ of the first fiber-optic time synchronization unit at a pre-synchronization stage, and coding the new adjustment amount $\Delta\tau'_{ad1}$ to the time code and sending to the second fiber-optic time synchronization unit;

at deciding by the second fiber-optic time synchronization unit to adjust the local timing signal of the second fiber-optic time synchronization unit, the second fiber-optic time synchronization unit adjusting its local timing signal via time delaying in accordance with the timing signal adjustment amount $\Delta\tau_{ad2}$ of the second fiber-optic time synchronization unit, and updating the timing signal adjustment amount $\Delta\tau'_{ad2}$ of the second fiber-optic time synchronization unit at the pre-synchronization stage, and coding the new adjustment amount $\Delta\tau'_{ad2}$ to the time code and sending to the first fiber-optic time synchronization unit;

step S205, the first fiber-optic time synchronization unit measures the difference $\tau_{21}$ of the local timing signal with the timing signal received from the second fiber-optic time synchronization unit, and calculating a clock difference $\Delta\tau=\frac{1}{2}(\tau_{21}-\tau_{12})-(\Delta\tau'_{ad1}+\Delta\tau'_{ad2})$ between the first fiber-optic time synchronization unit and the second fiber-optic time synchronization unit in accordance with the measured difference $\tau_{21}$, the received adjustment amount $\Delta\tau'_{ad2}$ of the timing signal at the second optical fiber time synchronization unit, the received difference $\tau_{12}$ measured by the second fiber-optic time synchronization unit, and the current adjustment amount $\Delta\tau'_{ad1}$ of the timing signal at the first optical fiber time synchronization unit;

the second fiber-optic time synchronization unit measuring the difference $\tau_{12}$ of the local timing signal with the timing signal received from the first fiber-optic time synchronization unit, and calculating a clock difference $\Delta\tau=\frac{1}{2}(\tau_{21}-\tau_{12})-(\Delta\tau'_{ad1}+\Delta\tau'_{ad2})$ between the first fiber-optic time synchronization unit and the second fiber-optic time synchronization unit in accordance with the difference, the received adjustment amount $\Delta\tau'_{ad1}$ of the timing signal the first fiber-optic time synchronization unit, the received difference $\tau_{21}$ as measured by the first fiber-optic time synchronization unit, and the current adjustment amount $\Delta\tau'_{ad2}$ of time signal at the second fiber-optic time synchronization unit.

The present invention further provides a system for time division based high precision two-way fiber-optic time transfer comprising a first fiber-optic time synchronization unit, a optical fiber link, and a second fiber-optic time synchronization unit:

the first fiber-optic time synchronization unit is comprised of a first fiber-optic time codec, a first optical transceiver, a first controller and processor, a first timing signal adjustor, a first optical fiber time interval counter, a first optical switch, and a first optical duplexer (such as a circulator or a coupler);

the first controller and processor is employed for controlling the first fiber-optic time codec in coding and decoding a time code, the first time interval counter in measuring a time difference between a local timing signal and a timing signal received from the second fiber-optic time synchronization unit, the first optical switch in sending an optical signal to the optical fiber link, the first timing signal adjustor in adjusting a time delay of the local timing signal; the first fiber-optic time codec is employed in coding and decoding the time code; the first time interval counter is employed in measuring the time delay difference between the timing signal outputted by the first fiber-optic time codec and the local timing signal of the first fiber optical time synchronization unit; the first optical transceiver is employed for transforming the optical signal from the optical fiber link to an electric signal and sending to the first fiber-optic time codec, and for modulating the time code outputted by the first fiber-optical time codec on an optical signal and sending to the first multiplexing module; the first optical switch is employed in switching on/off the transmitting of the optical signal from the first optical transceiver to the optical fiber link; the first optical duplexer is employed in enabling the first optical transceiver to send and receive the optical signal through the same optical fiber.

The second fiber-optic time synchronization unit comprises a second fiber-optic time codec, a second optical transceiver, a second controller and processor, a second time interval counter, a second timing signal adjustor, a second optical switch, and a second optical duplexer (such as a circulator or a coupler).

The second controller and processor is employed for controlling the second fiber-optic time codec, the second time interval counter, and the second optical switch, to realize the control of two-way time transfer with the first fiber-optic time synchronization unit and clock difference calculation; the second fiber-optic time codec is employed for coding and decoding the time code; the second optical transceiver is employed for transforming the optical signal from the optical fiber link to an electric signal and sending to the second fiber-optic time codec, and for modulating the time code on the optical signal and sending along the optical fiber link; the second optical switch is employed in switching on/off the transmitting of optical signal from the second optical transceiver to the optical fiber link; the second timing signal adjustor is employed for adjusting the time delay of the local timing signal; the second optical duplexer (such as a circulator or a coupler) is employed in enabling the second optical transceiver to send and receive the optical signal through the same optical fiber.

The advantages of the present invention as compared with prior art is, effectively overcoming the influence of optical fiber backscattering on the two-way time transfer, while maintaining the propagation delay symmetry of fiber link by the means of BTDM-SFSW based technique.

DETAILED DESCRIPTION OF THE INVENTION AND EMBODIMENTS

In combination with an embodiment and the drawings hereunder provided, the present invention will be further enunciated. The embodiment is based on the technical solutions of the present invention and is provided with detailed implementation methods and processes, but is not meant to limit the scope of protection of the present invention.

Figure 1:
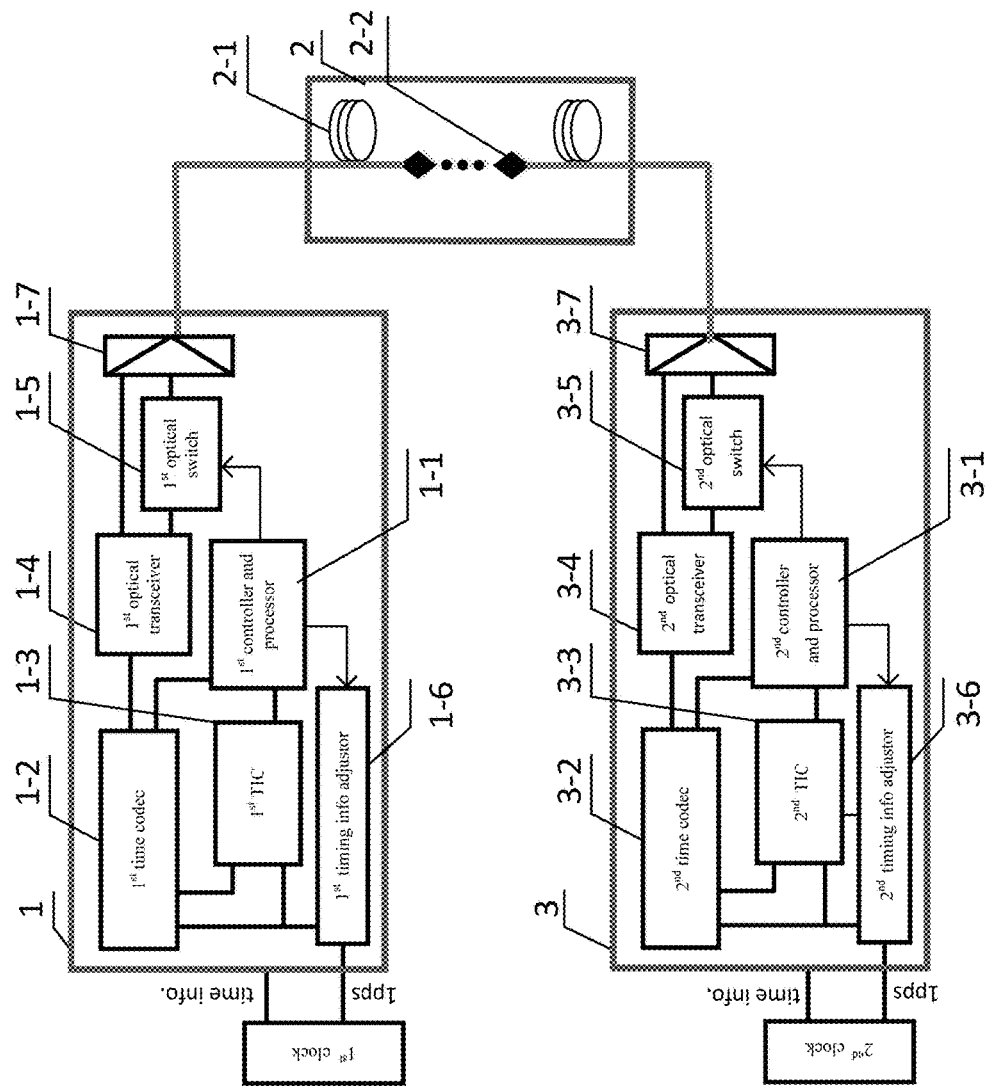
FIG. 1 is a schematic diagram showing the structure for an embodiment of the present invention.
Figure 2:
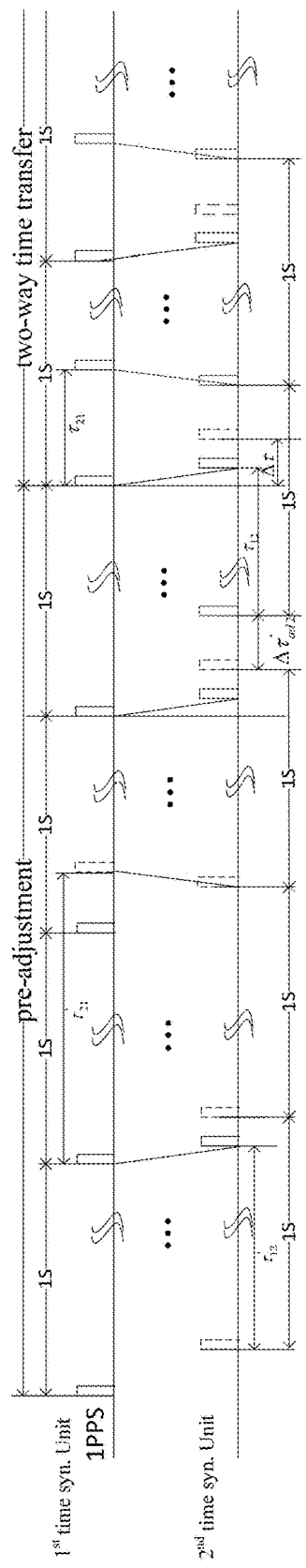
FIG. 2 is a schematic diagram showing the process of the pre-adjusting and the two-way time transfer for the embodiment of the present invention.
Figure 3:
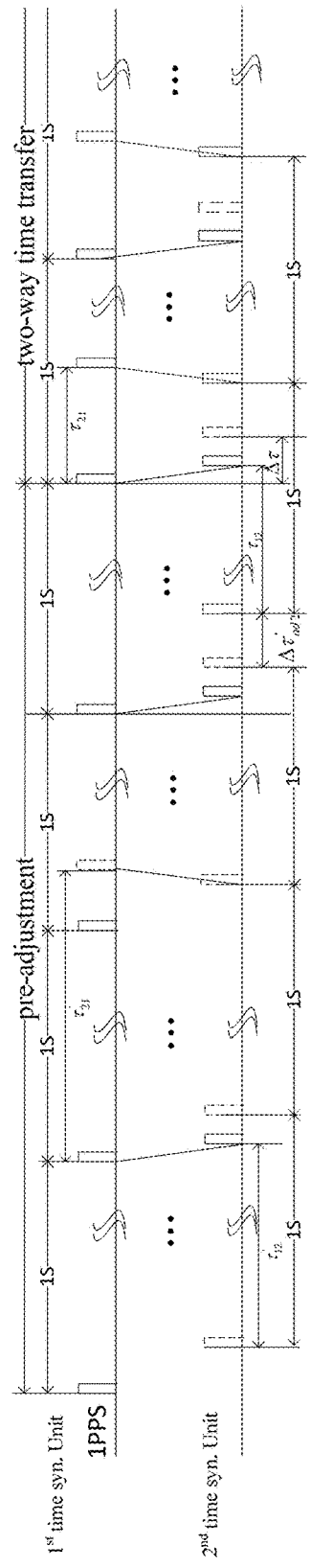
FIG. 3 is a schematic diagram showing another process of the pre-adjusting and the two-way time transfer for the embodiment of the present invention.
Figure 4:
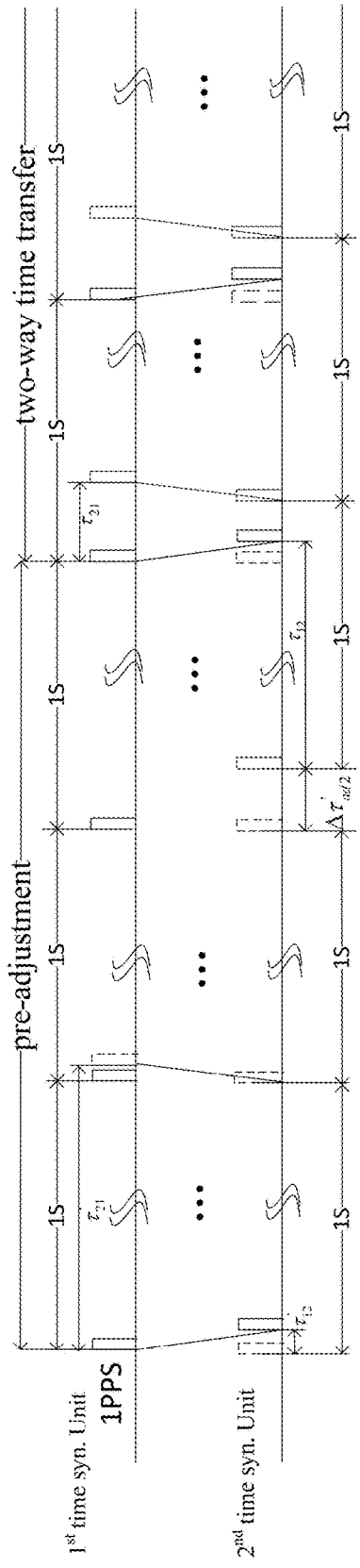
FIG. 4 is a schematic diagram showing yet another process of the pre-adjusting and the two-way time transfer for the embodiment of the present invention.
Figure 5:
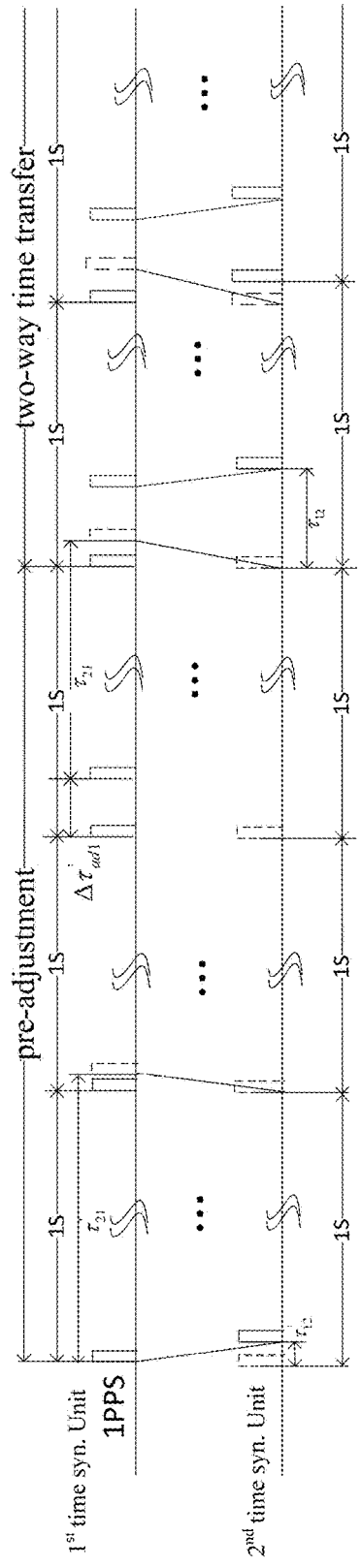
FIG. 5 is a schematic diagram showing yet another process of the pre-adjusting and the two-way time transfer for the embodiment of the present invention.
Figure 6:
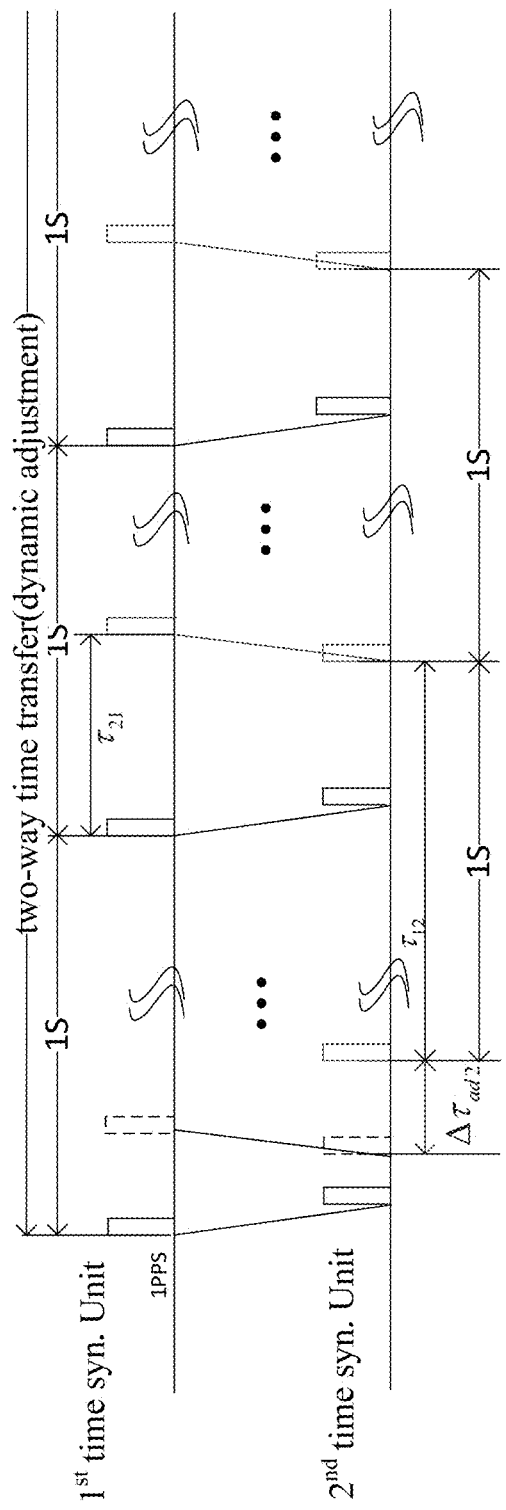
FIG. 6 is a schematic diagram showing a dynamic adjustment process for the two-way time transfer stage for the embodiment of the present invention.
Figure 7:
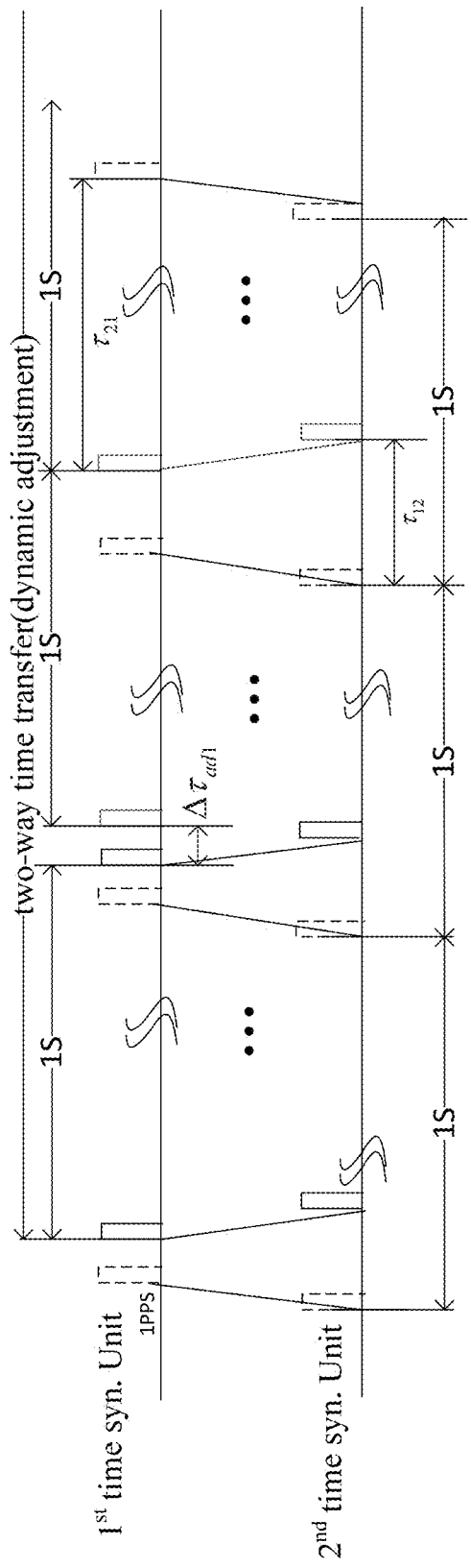
FIG. 7 is a schematic diagram showing another dynamic adjustment process for the two-way time transfer stage for the embodiment of the present invention.

As shown in FIG. 1, the optical fiber link 2 is constituted by bidirectional optical amplifiers and optical fibers. A first fiber-optic time synchronization unit 1 is on an end of the optical fiber link 2, and a second fiber-optic time synchronization unit 3 is on the other end of the optical fiber link 2.

A first controller and processor 1-1 of the first fiber-optic time synchronization unit, at detecting a timing signal outputted by a first time delay adjustor 1-6, controls a first fiber-optic time codec 1-2 in coding a time code, and switches on a first optical switch 1-5. The coded time code is transformed to an optical signal via a first optical transceiver 1-4, transmitted to a output port of a first optical duplexer 1-7 and sent to the second fiber-optic time synchronization unit via the optical fiber link 2. Subsequent to sending the time code, the first controller and processor 1-1 switches off the first optical switch 1-5. The optical signal sent from the first fiber-optic time synchronization unit is received by the second fiber-optic time synchronization unit, is transformed to an electric signal via a second optical duplexer 3-7 and a second optical transceiver 3-4 and is transmitted to a second time codec 3-2. A second controller and processor 3-1, at detecting a timing signal decoded from the time code from the first fiber-optic time synchronization unit by the second time codec 3-2, controls a second time interval counter 3-6 in measuring a difference $\tau'_{12}$ of a local timing signal with the timing signal received from the first fiber-optic time synchronization unit, and while the local timing signal outputted from a second timing signal adjustor 3-3 is valid, controls the second time codec 3-2 in coding the time code including the measured difference $\tau'_{12}$ and switches on a second optical switch 3-5. The coded time code is transformed to an optical signal via the second optical transceiver 3-4, transmitted to a output port of the second optical duplexer 3-7, and sent to the first fiber-optic time synchronization unit via the optical fiber link 2. Subsequent to sending the time code, the second controller and processor 3-1 controls the second optical switch 3-5 to switch off. The optical signal sent from the second fiber-optic time synchronization unit is received by the first fiber-optic time synchronization unit, is transformed to an electric signal via the first duplexer 1-7 and the first optical transceiver 3-4, and is transmitted to a first time codec 1-2. The first controller and processor 1-1, at detecting the timing signal decoded from the time code from the second fiber-optic time synchronization unit by the first time codec 1-2, controls the first time interval counter 1-6 in measuring a difference $\tau'_{21}$ of the local timing signal with the timing signal received from the second fiber-optic time synchronization unit, and controls the first time codec 1-2 in extracting the difference $\tau'_{12}$ from the received time code. The first controller and processor 1-1 determines a corresponding timing signal adjustment value for the respective time synchronization unit according to $\tau'_{21}$, $\tau'_{12}$, the length between any two consecutive timing signals $\Delta$ ($\Delta$ being equal to 1 second if the timing signal being 1PPS), the time length $\tau_B$ ($<\Delta/2$) of the time code, and a redundant time $\tau_M$ ($<\Delta/2$, greater than the sum of the time for switching-on the transmission of the optical signal, the time for switching-off the transmission of the optical signal, and the error of measuring the time intervals) reserved for time division multiplexing in accordance with Table 3.

TABLE 3

| Condi 1 | Condi 2 | Adjust unit | Adjust amount $\tau_{adi}'$ | FIG. |
|---|---|---|---|---|
| $\tau_{21}' < 1(s)$ | $1(s) - \tau_{12}' > \tau_B + \tau_M$ | 1$^{st}$ optical fiber sync unit | $(\tau_B + \tau_M) - (1(s) - \tau_{21}')$ | 2 |
|  | others |  | No need for adjustment |  |
| $\tau_{21}' \geq 1(s)$ | $1(s) - \tau_{12}' < \tau_B + \tau_M$ | 2$^{nd}$ optical fiber sync unit | $(\tau_B + \tau_M) - (1(s) - \tau_{12}')$ | 3 |
|  | $\tau_{12}' < \tau_B + \tau_M$ $\tau_{12}' > (\tau_B + \tau_M) - (\tau_{21}' - 1(s))$ | 1$^{st}$ optical fiber sync unit | $(\tau_B + \tau_M) + \tau_{21}'$ | 4 |
|  | $(\tau_B + \tau_M) - (\tau_{21}' - 1(s)) > (\tau_B + \tau_M) - \tau_{12}'$ | 2$^{nd}$ optical fiber sync unit | $(\tau_B + \tau_M) + \tau_{12}'$ | 5 |
|  | Others |  | No need for adjustment |  | where $\Delta\tau'_{ad1}$ is a timing signal adjustment amount of the first fiber-optic time synchronization unit in the pre-synchronization stage, $\Delta\tau'_{ad2}$ being a timing signal adjustment amount of the second fiber-optic time synchronization unit in the pre-synchronization stage.

If the first controller and processor 1-1 of the first fiber-optic time synchronization unit decides by calculation that the second fiber-optic time synchronization unit should adjust its local timing signal, the first controller and processor 1-1 controls the first fiber-optic time codec in coding the $\Delta\tau'_{ad2}$ into the time code, and, while its local timing signal is valid, switches on the first optical switch 1-5. The coded time code is transformed to the optical signal via the first optical transceiver 1-4 transmitted to the output port of the first duplexer 1-7, and sent to the second fiber-optic time synchronization unit via the optical fiber link 2. Subsequent to sending the time code, the first controller and processor 1-1 controls the first optical switch 1-5 to switch off. The second controller and processor 3-1, at detecting the $\Delta\tau'_{ad2}$ sent from the first fiber-optic time synchronization unit, controls the second timing signal adjustor 3-3 in adjusting the local timing signal according to the timing signal adjustment amount $\Delta\tau'_{ad2}$, and records the adjustment amount.

If the first fiber-optic time synchronization unit decides by calculation that the first fiber-optic time synchronization unit is required to adjust its local timing signal, the first controller and processor 1-1 controls the first timing signal adjustor 1-3 in adjusting the local timing signal via time delay according to the timing signal adjustment amount $\Delta\tau'_{ad1}$, and records the adjustment amount.

Subsequent to the completion of pre-adjusting, the first fiber-optic time synchronization unit and the second fiber-optic time synchronization unit conduct the two-way time transfer. The first controller and processor 1-1 of the first fiber-optic time synchronization unit, at detecting a local timing signal, controls the first optical fiber codec 1-2 in coding the time code carrying the local timing signal, a time information, the measured time difference between the local timing signal with the timing signal received from the second fiber-optic time synchronization unit, and the adjustment amount $\Delta\tau'_{ad1}$ of the local timing signal of the first fiber-optic time synchronization unit, and switches on the first optical switch 1-5. The coded time code is transformed to the optical signal via the first optical transceiver 1-4, and sent to the second fiber-optic time synchronization unit via the optical fiber link 2. Subsequent to sending the time code, the first controller and processor 1-1 controls the first optical switch 1-5 to switch off.

The second controller and processor 3-1 of the second fiber-optic time synchronization unit, at detecting a valid local timing signal, controls the second optical fiber codec 3-2 in coding the time code carrying its local timing signal, a time information, the measured difference of the local timing signal with the timing signal received from the first fiber-optic time synchronization unit, and the adjustment amount $\Delta\tau'_{ad2}$ of the local timing signal of the second fiber-optic time synchronization unit, and switches on the second optical switch 3-5. The coded time code is transformed to the optical signal via the second optical transceiver 3-4 and sent to the first fiber-optic time synchronization unit via the optical fiber link 2. Subsequent to sending the time code, the second controller and processor 3-1 controls the second optical switch 3-5 to switch off.

The first time interval counter 1-6 of the first fiber-optic time synchronization unit measures the difference $\tau_{21}$ of the local timing signal with the timing signal received from the second fiber-optic time synchronization unit, and calculates a clock difference $\Delta\tau=\frac{1}{2}(\tau_{21}-\tau_{12})-(\Delta\tau'_{ad1}+\Delta\tau'_{ad2})$ between the first fiber-optic time synchronization unit and the second fiber-optic time synchronization unit in accordance with the difference $\tau_{21}$, the adjustment amount $\Delta\tau'_{ad2}$ of the sending time of the timing signal of the second fiber-optic time synchronization unit, the received difference $\tau_{12}$ as measured by the second fiber-optic time synchronization unit, the local timing signal adjustment amount $\Delta\tau'_{ad1}$.

The second time interval counter 3-6 of the second fiber-optic time synchronization unit measures the difference $\tau_{12}$ of the local timing signal with the timing signal received from the first fiber-optic time synchronization unit, and calculates a clock difference $\Delta\tau=\frac{1}{2}(\tau_{21}-\tau_{12})-(\Delta\tau'_{ad1}+\Delta\tau'_{ad2})$ between the first fiber-optic time synchronization unit and the second fiber-optic time synchronization unit in accordance with the difference $\tau_{12}$, the adjustment amount $\Delta\tau'_{ad1}$ of the sending time of the timing signal of the first fiber-optic time synchronization unit, the received difference $\tau_{21}$ as measured by the first fiber-optic time synchronization unit, the local timing signal adjustment amount $\Delta\tau'_{ad2}$.

The first controller and processor 1-1 of the first fiber-optic time synchronization unit, in accordance with the measured difference $\tau_{21}$ between the local timing signal and the one received from the second fiber-optic time synchronization unit, the $\tau_{12}$ received from the second fiber-optic time synchronization unit, the time code duration $\tau_B$, the time length between any two consecutive timing signal $\Delta$ ($\Delta$ being equal to 1 second if the timing signal being 1PPS), and a redundant time $\tau_M$ reserved for time division multiplexing, decides on the fiber-optic time synchronization unit needed to be adjusted and the corresponding adjustment amount according to Table 4.

The second controller and processor 3-1 of the second fiber-optic time synchronization unit, in accordance with the measured difference $\tau_{12}$ between the local timing signal and the timing signal sent from the first fiber-optic time synchronization unit, the $\tau_{21}$ received from the first fiber-optic time synchronization unit, the time code duration $\tau_B$, the time length between any two consecutive timing signal $\Delta$ ($\Delta$ being equal to 1 second if the timing signal being 1PPS), and a redundant time $\tau_M$ reserved for time division multiplexing, decides on the fiber-optic time synchronization unit needed to be adjusted and the corresponding adjustment amount according to Table 4.

TABLE 4

| condition | Adjustment unit | Adjustment amount $\tau_{adi}$ | FIG. |
|---|---|---|---|
| $1(s) - \tau_{12} > \tau_B + \tau_M$ | $2^{nd}$ optical fiber sync unit | $(\tau_B + \tau_M) - (1(s) - \tau_{12})$ | 6 |
| $1(s) - \tau_{21} > \tau_B + \tau_M$ | $1^{st}$ optical fiber sync unit | $(\tau_B + \tau_M) - (1(s) - \tau_{21})$ | 7 |
| others | | No need for adjustment | |

If the first fiber-optic time synchronization unit calculates that the first fiber-optic time synchronization unit is required to adjust the local timing signal, the first controller and processor 1-1, in accordance with the timing signal adjustment amount $\Delta\tau_{ad1}$, controls the first timing signal adjustor 1-3 to adjust the time delay of the local timing signal by $\Delta\tau_{ad1}$, updates the adjustment amount $\Delta\tau'_{ad1}$ in the pre-synchronization stage, codes the adjustment amount $\Delta\tau'_{ad1}$ into the time code and sends to the second fiber-optic time synchronization unit.

If the second fiber-optic time synchronization unit calculates that the second fiber-optic time synchronization unit is required to adjust the local timing signal, the second controller and processor 3-1, in accordance with the timing signal adjustment amount $\Delta\tau_{ad2}$, controls the second timing signal adjustor 3-3 to adjust the time delay of the local timing signal by $\Delta\tau_{ad2}$, updates the adjustment amount $\Delta\tau'_{ad2}$ in the pre-synchronization stage, and codes the adjustment amount $\Delta\tau'_{ad2}$ into the time code and sends to the first fiber-optic time synchronization unit.

We claim:

1. A method for high-precision two-way fiber-optic time transfer, comprising
   (1) pre-adjusting, comprising the steps of
   a first fiber-optic time synchronization unit, at detecting a local timing signal at the first fiber-optic time synchronization unit, sends a first time code including the local timing signal at the first fiber-optic time synchronization unit to a second fiber-optic time synchronization unit via an optical fiber link;
   the second fiber-optic time synchronization unit, at detecting the local timing signal at the first fiber-optic time synchronization unit that is decoded from the first time code, measures time difference $\tau'_{12}$ between a local timing signal at the second fiber-optic time synchronization unit and the local timing signal at the first fiber-optic time synchronization unit as it is decoded from the first time code, and while the local timing signal at the second fiber-optic time synchronization unit is valid, codes the local timing signal at the second fiber-optic time synchronization unit and the time difference $\tau'_{12}$ into a second time code and sends to the first fiber-optic time synchronization unit via the optical fiber link;

the first fiber-optic time synchronization unit decoding the local timing signal at the second fiber-optic time synchronization unit and the time difference $\tau'_{12}$ from the second time code, measures time difference $\tau'_{21}$ between the local timing signal at the first fiber-optic time synchronization unit and the local timing signal as decoded from the second time code;

the first fiber-optic time synchronization unit deciding on the time synchronization unit required to adjust its local timing signal and calculating corresponding adjustment amount to meet requirement of two-way time division multiplexing as follows:

adjusting the first fiber-optic time synchronization unit with an adjustment amount $(\tau_B+\tau_M)-(\Delta-\tau'_{21})$, when $\tau'_{21}<\Delta$ and $\Delta-\tau'_{12}>\tau_B+\tau_M$ adjusting the second fiber-optic time synchronization unit with an adjustment amount $(\tau_B+\tau_M)-(\Delta-\tau'_{21})$, when $\tau'_{21}\geq\Delta$ and $\Delta-\tau'_{12}<\tau_B+\tau_M$;

adjusting the first fiber-optic time synchronization unit with an adjustment amount $(\tau_B+\tau_M)+\tau'_{21}$, when $\tau'_{21}\geq\Delta$ and $\tau'_{12}<\tau_B+\tau_M$, and $(\tau_B+\tau_M)-\tau'_{12}>(\tau_B+\tau_M)-(\tau'_{21}-\Delta)$;

adjusting the second fiber-optic time synchronization unit with an adjustment amount $(\tau_B+\tau_M)+\tau'_{12}$ when $\tau'_{21}\geq\Delta$ and $\tau'_{12}<\tau_B+\tau_M$, and $(\tau_B+\tau_M)-(\tau'_{21}-\Delta)>(\tau_B+\tau_M)-\tau'_{12}$; and deciding no adjustment requirement otherwise;

wherein $\Delta$ is a length between two consecutive local timing signal (wherein $\Delta$ is equal to 1 second if the timing signal is 1 pulse-per-second (PPS); $\tau_B$ is a time length ($<\Delta/2$) of time code; $\tau_M$ is a redundant time reserved ($<\Delta/2$, and greater than a sum of a time for switching on optical signal transmission, a time for switching off the optical signal transmission, and errors in measurement of the time differences $\tau'_{21}$ and $\tau'_{12}$) for time division multiplexing;

when it is required to adjust the local timing signal of the second fiber-optic time synchronization unit, the first fiber-optic time synchronization unit codes an adjustment amount $\Delta\tau'_{ad2}$ into a time code and sends to the second fiber-optic time synchronization unit via the optical fiber link; the second fiber-optic time synchronization unit delays its local timing signal by the received adjustment amount $\Delta\tau'_{ad2}$ and records the adjustment amount;

when it is required to adjust the local timing signal of the first fiber-optic time synchronization unit, the first fiber-optic time synchronization unit adjusts delay of its local timing signal in accordance with an adjustment amount $\Delta\tau'_{ad1}$, and records the adjustment amount;

(2) conducting time division multiplexing based two-way time transfer over the optical fiber link by the first and second optical fiber time synchronization units, comprising following steps:

the first fiber-optic time synchronization unit measuring the time difference $\tau_{21}$ between the local timing signal and the timing signal decoded from the second time code received from the second fiber-optic time synchronization unit, and the second fiber-optic time synchronization unit measuring the time difference $\tau_{12}$ of the local timing signal and the timing signal decoded from the first time code received from the first fiber-optic time synchronization unit;

the first fiber-optic time synchronization unit, while its local timing signal is valid, switching on optical signal transmission, and sending via the optical fiber link to the second fiber-optic time synchronization unit a time code, said time code carrying the local timing signal of the first fiber-optic time synchronization unit, the time information, the measured time difference $\tau_{21}$, and the adjustment amount $\Delta\tau'_{ad1}$ of the local timing signal of the first fiber-optic time synchronization unit, and switching off signal transmission via the optical fiber link in other time durations;

the second fiber-optic time synchronization unit, while its local timing signal is valid, switching on optical signal transmission, and sending via the optical fiber link to the first fiber-optic time synchronization unit an other time code, said other time code carrying the local timing signal of the second fiber-optic time synchronization unit, a time info, the measured difference $\tau_{21}$, and the adjustment amount $\Delta\tau'_{ad2}$ of the local timing signal of the second fiber-optic time synchronization unit, and switching off signal transmission via the optic fiber link at other time durations;

the first fiber-optic time synchronization unit and the second fiber-optic time synchronization unit respectively deciding the fiber-optic time synchronization unit required to adjust its timing signal and calculating a corresponding adjustment amount;

at deciding by the first fiber-optic time synchronization unit on a requirement of the first optical fiber time synchronization unit to adjust its local timing signal, the first optical fiber time synchronization unit adjusting delay of its local timing signal in accordance with the adjustment amount $\Delta\tau_{ad1}$, and updating the adjustment amount $\Delta\tau'_{ad1}$ to $(\Delta\tau'_{ad1}+\Delta\tau_{ad1})$, and coding the updated adjustment amount $\Delta\tau'_{ad1}$ to a time code and sending the time code coded to the second fiber-optic time synchronization unit;

at deciding by the second optical fiber time synchronization unit on a requirement of the second optical fiber time synchronization unit to adjust its local timing signal, the second optical fiber time synchronization unit adjusting delay of its local timing signal in accordance with the adjustment amount $\Delta\tau_{ad2}$, and updating the adjustment amount $\Delta\tau'_{ad2}$ to $(\Delta\tau'_{ad2}+\Delta\tau_{ad2})$, and coding the updated adjustment amount $\Delta\tau'_{ad2}$ to a time code and sending the time code to the first optical fiber time synchronization unit;

the first fiber-optic time synchronization unit decoding the timing signal, $\tau_{12}$, and $\Delta\tau'_{ad2}$ from the time code received from the second fiber-optic time synchronization unit, measuring the difference $\tau_{21}$ between its local timing signal and the timing signal decoded from the time code received from the second fiber-optic time synchronization unit, and calculating a clock difference between the first fiber-optic time synchronization unit and the second fiber-optic time synchronization unit as: $\Delta\tau=\frac{1}{2}(\tau_{21}-\tau_{12})-(\Delta\tau'_{ad1}+\Delta\tau'_{ad2})$;

the second fiber-optic time synchronization unit decoding the timing signal, $\tau_{21}$, and $\Delta\tau'_{ad1}$ from the time code received from the first fiber-optic time synchronization unit, measuring the difference $\tau_{12}$ of the local timing signal with the timing signal decoded from the time code received from the first fiber-optic time synchronization unit, and calculating a clock difference between the first fiber-optic time synchronization unit and the second fiber-optic time synchronization unit as: $\Delta\tau=\frac{1}{2}(\tau_{21}-\tau_{12})-(\Delta\tau'_{ad1}+\Delta\tau'_{ad2})$.

2. The method of claim 1, wherein the first fiber-optic time synchronization unit and the second fiber-optic time synchronization unit respectively decide on the fiber-optic time synchronization unit required to adjust its timing signal and calculate the corresponding adjustment amount in two-way time transfer stage by adjusting the second fiber-optic time synchronization unit with the adjustment amount $\Delta\tau_{ad2}=(\tau_B+\tau_M)-(\Delta-\tau_{12})$ when $\Delta-\tau_{12}>\tau_B+\tau_M$; and adjusting the first fiber-optic time synchronization unit with the adjustment amount $\Delta\tau_{ad1}=(\tau_B+\tau_M)-(\Delta-\tau_{21})$ when $\Delta-\tau_{21}>\tau_B+\tau_M$;

wherein $\Delta$ is a length between two consecutive local timing signal (wherein $\Delta$ is equal to 1 second if the timing signal is 1 pulse-per-second (PPS)); $\tau_B$ is the time length ($<\Delta/2$) of the time code; and $\tau_M$ is the redundant time reserved for time division multiplexing.

3. A high-precision fiber-optic time transfer system for implementing the high-precision fiber-optic two-way time transfer method of claim 1, comprising a first fiber-optic time synchronization unit,
a two-way optical fiber link, and
a second fiber-optic time synchronization unit;
wherein the first fiber-optic time synchronization unit comprises
a first fiber-optic time codec,
a first optical transceiver,
a first controller and processor,
a first timing signal adjustor,
a first time interval counter,
a first optical switch, and
a first optical duplexer;

the first controller and processor is employed for controlling the first fiber-optic time codec in coding and decoding a time code, the first time interval counter in measuring a time difference between a local timing signal and a timing signal detected from a time code received from the second fiber-optic time synchronization unit, the first optical switch in sending an optical signal to the optical fiber link, the first timing signal adjustor in adjusting a time delay of the local timing signal;

the first fiber-optic time codec is employed in coding and decoding the time code to and from the second fiber-optic time synchronization unit;

the first time interval counter is employed in measuring time difference between the timing signal decoded by the first fiber-optic time codec and the local timing signal of the first fiber optical time synchronization unit;

the first optical transceiver is employed for transforming the optical signal from the optical fiber link to an electric signal and sending to the first fiber-optic time codec, and for modulating the time code outputted by the first fiber-optical time codec on an optical signal and sending to the first multiplexing module;

the first optical switch is employed in switching on/off the transmitting of the optical signal from the first optical transceiver to the optical fiber link;

the first optical duplexer is employed in enabling the first optical transceiver to send and receive the optical signal through the same optical fiber;

the first timing signal adjustor is controlled by the first controller and processor in adjusting the time delay of the local timing signal;

wherein the second fiber-optic time synchronization unit comprises a second fiber-optic time codec,
a second optical transceiver,
a second controller and processor,
a second time interval counter,
a second optical switch,
a second timing signal adjustor, and
a second optical duplexer;

the second controller and processor is employed for controlling the second fiber-optic time codec, the second time interval counter, and the second optical switch, to realize the control of two-way time transfer with the first fiber-optic time synchronization unit and clock difference calculation;

the second fiber-optic time codec is employed for coding and decoding the time code to and from the first fiber-optic time synchronization unit;

the second time interval counter is employed in measuring time difference between the timing signal decoded out by the second fiber-optic time codec and the local timing signal of the second fiber optical time synchronization unit;

the second optical transceiver is employed for transforming the optical signal from the optical fiber link to an electric signal and sending to the second fiber-optic time codec, and for modulating the time code on an optical signal and sending along the optical fiber link;

the second optical switch is employed in switching on/off the transmitting of optical signal from the second optical transceiver to the optical fiber link;

the second timing signal adjustor is employed for adjusting the time delay of the local timing signal under control of the second controller and processor; and the second optical duplexer is employed in enabling the second optical transceiver to send and receive the optical signal through the same optical fiber.

4. The high-precision fiber-optic time transfer system of claim 3, wherein the optical fiber link comprises optical fibers and bidirectional amplifiers.

5. The high-precision fiber-optic time transfer system of claim 3, wherein coding of the time code by the first optical fiber time synchronization unit refers to coding a timing signal and a time info from a first clock, a control info and measured values by two-way time transfer, and the local adjustment amount of the first fiber-optic time synchronization unit into a time synchronization code, and outputting to the first optical transceiver;

decoding of the time code by the first fiber-optic time synchronization unit refers to decoding the corresponding timing signal and time info from the time code from the second fiber-optic time synchronization unit, and inputting the timing signal to the first time interval counter.

6. The high-precision fiber-optic time transfer system of claim 3, wherein coding of the time code by the second fiber-optic time synchronization unit refers to coding a timing signal and a time info from a local clock, a control info and measured values by two-way time transfer, and the local adjustment amount of the second fiber-optic time synchronization unit into a time synchronization code, and sending to the second optical transceiver; and decoding of the time code by the second fiber-optic time synchronization unit refers to decoding the corresponding timing signal and time info, the time delay difference measured by the first fiber-optic time synchronization unit, and the local adjustment amount, from the time code from the first fiber-optic time synchronization unit.

* * * * *